United States Patent
Bradburn et al.

(10) Patent No.: US 10,460,219 B2
(45) Date of Patent: Oct. 29, 2019

(54) GENERATING AN OBJECT MAP FROM A PLURALITY OF BINARY IMAGES

(71) Applicants: Hewlett-Packard Development Company, L.P., Houston, TX (US); Purdue Research Foundation, West Lafayette, IN (US)

(72) Inventors: Brent Michael Bradburn, Boise, ID (US); Zuguang Xiao, Indianapolis, IN (US); Mengqi Gao, West Lafayette, IN (US); Lu Wang, Mountain View, CA (US); Jan P. Allebach, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 251 days.

(21) Appl. No.: 15/087,246

(22) Filed: Mar. 31, 2016

(65) Prior Publication Data
US 2017/0286815 A1    Oct. 5, 2017

(51) Int. Cl.
G06K 15/12 (2006.01)
G06K 15/02 (2006.01)
G06K 15/14 (2006.01)

(52) U.S. Cl.
CPC ......... G06K 15/1881 (2013.01); G06K 15/12 (2013.01); G06K 15/14 (2013.01)

(58) Field of Classification Search
None
See application file for complete search history.

(56) References Cited

U.S. PATENT DOCUMENTS

| | | | | |
|---|---|---|---|---|
| 5,602,940 A * | 2/1997 | Inoue | ................. | G06T 7/11 |
| | | | | 382/180 |
| 6,400,853 B1 * | 6/2002 | Shiiyama | ............. | G06F 17/3025 |
| | | | | 358/403 |
| 7,688,473 B2 | 3/2010 | Purdum et al. | | |
| 8,848,249 B2 | 9/2014 | Park et al. | | |
| 8,873,106 B2 | 10/2014 | Robinson | | |
| 8,947,736 B2 | 2/2015 | Yu et al. | | |
| 9,013,756 B2 | 4/2015 | Stevens | | |
| 2001/0033285 A1 * | 10/2001 | Okuno | .................. | G06F 17/218 |
| | | | | 345/467 |

(Continued)

OTHER PUBLICATIONS

Chen, Y-Ting et al., "Segmentation for better rendering of mixed-content pages", IS&T/SPIE Electronic Imaging, International Society of Optics and Photonics, 2013.

(Continued)

Primary Examiner — Huo Long Chen
(74) Attorney, Agent, or Firm — Rong, Rea, Bentley & Kim LLC (57) ABSTRACT

In an example, a method is described that includes dividing an input image into a plurality of strips, where each strip is smaller than a whole of the input image. A plurality of binary images is then generated, where each of the binary images corresponds to one of the strips. Connected component labeling is performed on the binary images, one binary image at a time. An object map for the input image is then generated based on the results of the connected component labeling.

14 Claims, 6 Drawing Sheets

(56) References Cited

U.S. PATENT DOCUMENTS

| | | | |
|---|---|---|---|
| 2006/0126093 A1* | 6/2006 | Fedorovskaya | G06K 9/00255 358/1.14 |
| 2007/0226611 A1* | 9/2007 | Sugimoto | G06F 17/212 715/210 |
| 2010/0045987 A1* | 2/2010 | Bonikowski | B41F 33/0036 356/402 |
| 2012/0294528 A1* | 11/2012 | Li | H04N 1/387 382/173 |
| 2015/0063688 A1* | 3/2015 | Bhardwaj | G06K 9/18 382/159 |

OTHER PUBLICATIONS

Park, Seong Jun, et al., "Halftone blending between smooth and detail screens to improve print quality with electrophontographic prints", IS&T/SPIE Electronic Imaging, International Society of Optics and Photonics, 2012.

Rosenfeld, Azriel et al., "Sequential Operations in Digital Picture Processing", Journal of the ACM (JACM) 13.4, 1966, pp. 471-494.

Kong, Weili et al., "Real-time Sobel Edge Detector", Proceedings of the 6th PSU-UNS International Conference on Engineering and Technology, 2013.

Lifeng, He et al., "A run-based two-scan labeling algorithm", Image Processing, IEEE Transactions on 1735 (2008): 749-756.

Cormen, Thomas H. et al., "Chapter 21: Data structures for Disjoint Sets", Introduction to Algoithms (second ed.), MIT Press, e-book pp. 423-444.

Wu, Kesheng, et al., "A simpler proof of the average case complexity of union-find with path compression", Technical Report LBNL-57527, Lawrence Berkeley National Laboratory, 2005.

Xerox® iGen® 150 Press, (Research Paper), Sep. 6, 2013.

Xiao, Zuguang et al., "Digital Image Segmentation for Object-Oriented Halftoning", IS&T International Symposium on Electronic Imaging 2016, Color Imaging XXI: Displaying, Processing, Hardcopy, and Applications, pp. 1-7, Feb. 15, 2016.

* cited by examiner

GENERATING AN OBJECT MAP FROM A PLURALITY OF BINARY IMAGES

BACKGROUND

Electrophotography is a dry photocopying technique that is widely used in imaging systems including laser printers. One step of the electrophotographic process is halftoning, in which a visual reproduction of an input digital image is printed using a reduced number of ink colors. Small dots of differing size and/or spacing, which are blended into smooth tones by the human eye, are used to convey the full range of colors. Thus, halftoning may be performed by rendering the reproduction of the input digital image through one or more screens of dots.

To reduce printing artifacts, screens of different frequencies (i.e., dot spacings) may be applied to different parts of the input digital image. For instance, symbol (e.g., text) and raster (e.g., image) objects in the input image may be rendered with high frequency screens, while vector (e.g., background) objects may be rendered with low frequency screens. This approach may be referred to as "object-oriented halftoning."

DETAILED DESCRIPTION

The present disclosure broadly describes an apparatus, method, and non-transitory computer-readable medium for generating an object map from a plurality of binary images. As discussed above, object-oriented halftoning may be used in electrophotography to reduce printing artifacts. The results of object-oriented halftoning can be improved by providing a highly accurate object map, which classifies all of the objects in the input image as symbol, raster, or vector. Thus, in a broad sense, the object map is a matrix of labels that indicate to what type of object each pixel in the input image belongs.

Objects in the input image may located and classified by performing connected component labeling (CCL) on one or more binary images corresponding to the input image. However, performing a classic two-pass raster order scanning CCL technique on a full binary image uses a tremendous amount of memory. Examples of the present disclosure reduce the amount of memory consumed by the two-pass CCL technique at any given time by segmenting the binary images into strips and then processing the strips one at a time. When the strips are processed in the order in which they appear in the binary images (e.g., moving from the top of the binary image to the bottom), some of the unique labels that are assigned to the objects in the first pass can be re-used in subsequent strips as objects are merged, thereby further reducing memory consumption by reducing the number of unique labels stored in memory data structures.

Figure 1:
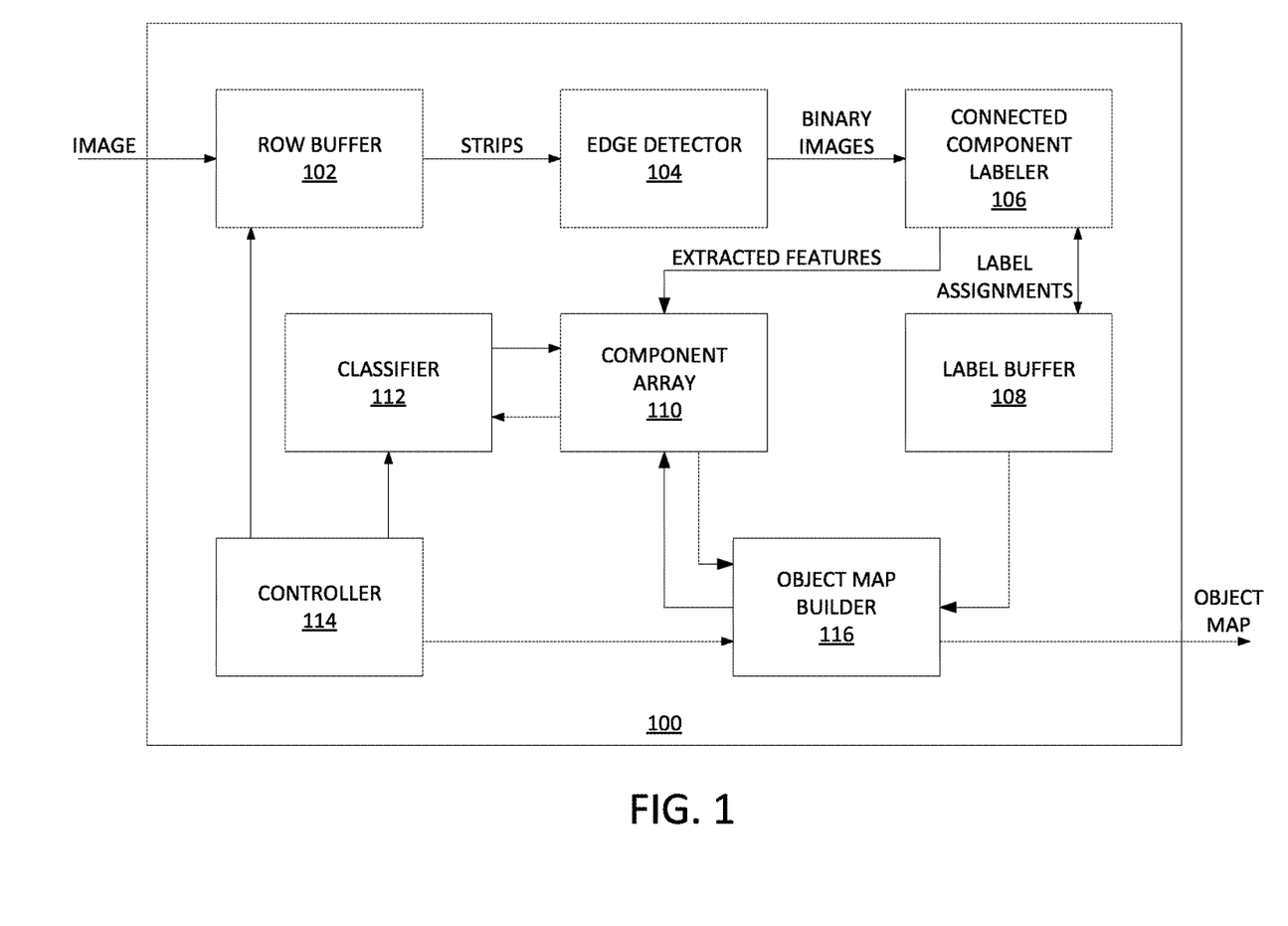
FIG. 1 is a block diagram of an example system of the present disclosure.

FIG. 1 is a block diagram of an example system 100 of the present disclosure. The system 100 is configured to receive as input a digital image including at least two different types of objects (i.e., raster, vector, and/or symbol) and to produce as output an object map corresponding to the digital image. In one example, the system 100 generally includes a row buffer 102, an edge detector 104, a connected component labeler 106, a label buffer 108, a component array 110 a classifier 112, a controller 114, and an object map builder 116.

The row buffer 102 comprises a data buffer that serves to divide an input image into a plurality of strips prior to further processing and to store the rows of pixels contained in these strips. In one example, each strip has a height that is approximately equal to (e.g., within some threshold tolerance) the height of a regular text character in the input image and a width that is approximately equal to the width of the input image. In one example, each strip includes three rows of pixels. Any object in the input image may be fully contained in a single strip, or may span multiple strips.

At each processing cycle, one new row of pixels from the input image is loaded into the row buffer 102, under the direction of the controller 114. Loading a new row of pixels into the row buffer 102 results in the eviction of the oldest row of pixels in the row buffer 102. In one example, the row buffer 102 loads the rows of pixels in the order in which they appear in the input image. For instance, the row buffer 102 may load the top-most row of pixels of the input image first, and then work its way downward, loading the bottom-most row of pixels of the input image last. Thus, the row of pixels that is loaded at the start of any given process cycle is adjacent in the input image to the row of pixels loaded at the start of the previous process cycle.

The edge detector 104 receives the strips from the row buffer 102 and processes the strips to produce a plurality of binary images. In one example, the edge detector 104 produces a plurality of binary images for each strip in order to account for the different properties of the different types of objects in the input image. For instance, symbol objects are usually small, with sharp edges and smooth interiors. Vector objects tend to be large and smooth. Raster objects can be large or small, but are generally very rough. An object can typically be accurately classified if its size and roughness are known. Moreover, if symbol and vector objects can be accurately identified in an input image, then the remaining objects can be classified as raster objects by default. Symbol objects can also be partitioned into symbol edge objects and symbol interior objects. In one particular example, the edge detector 104 produces three distinct binary images from each strip. In this case, the three binary images may include: (1) a first binary image to find symbol edge objects; (2) a second binary image to find symbol interior objects; and (3) a third binary image to find vector objects.

The edge detector 104 includes an edge detection filter, such as a Sobel filter, for performing edge detection on the strips. One method for producing a plurality of binary images is discussed in greater detail in connection with FIG. 3.

The connected component labeler 106 receives the binary images from the edge detector 104 and processes the binary images in order to assign unique labels to each connected component (i.e., connected set of foreground pixels) in the binary images. In one example, the connected component labeler 106 includes thresholding logic that first applies a threshold edge magnitude condition to the edge detection filter's results. The connected component labeler 106 further includes CCL logic for assigning the labels to the connected components. In one example, the CCL logic uses 4-connectivity to identify connected pixels. This means that if a candidate foreground pixel is the northern or western neighbor of a reference foreground pixel, then the candidate foreground pixel and the reference foreground pixel are considered to be connected. In a further example, the CCL logic performs at least the first pass of a multi-pass technique (e.g., a two-pass technique) to identify connected components that are of interest (i.e., likely to be symbol, vector, or raster objects). The connected component labeler 106 outputs label assignments to the label buffer 108. One method for assigning labels to connected sets of pixels is discussed in greater detail in connection with FIG. 4.

In addition, the connected component labeler 106 may include feature extraction logic for extracting features of the pixels to which the labels are being assigned. In this case, the connected component labeler 106 outputs extracted features to the component array 110.

The label buffer 108 stores information regarding label assignments made by the connected component labeler 106. The connection between the label buffer 108 and the connected component labeler 106 is bidirectional, because the connected component labeler 106 may use one or more of the labels assigned to pixels in a previously processed binary image to a label pixels in a binary image that is currently being processed. The label buffer 108 also outputs information regarding label assignments to the object map builder 116.

The component array 110 stores pixel features extracted by the connected component labeler 106. The component array uses the extracted features to merge equivalent connected components (i.e., connected components that are actually part of the same larger connected component) when conflicts arise in the neighborhood context. The component array 110 outputs information regarding any merged connected components to the object map builder 116 and to the classifier 112.

The object map builder 116 receives information regarding label assignments from the label buffer 108. For instance, once a row of pixel labels is assigned in the label buffer 108, the labels are copied to a corresponding row in the object map builder 116. Assigned rows are copied from the label buffer 108 into the object map builder 116 until a binary image boundary is reached.

The controller 114 controls various elements of the system 100 and coordinates the actions of these elements. For instance, when a binary image boundary is reached, the controller 114 signals the row buffer 102 to stop loading rows of pixels from the input image. The controller 114 also signals the classifier 112 at this time to classify (e.g., as "of interest" or "not of interest") all of the connected components currently in the component array 110 and to store the classification results back to the component array 110. After the connected components in the component array 110 are classified, the controller 114 signals the object map builder 116 to read the classification results from the component array 110. As a result of reading these classification results, the object map builder 116 may replace the labels of the previous binary image in the object map with the results of the classification.

The classifier 112 includes CCL logic for replacing labels assigned by the connected component labeler 106 with new labels that indicate whether a connected component is of interest or not of interest. Whether or not a given connected component is of interest may depend on the type of the binary image being analyzed. For instance, if the binary image is a binary image that has been created (e.g., through edge detection and/or thresholding) to facilitate the identification of symbol edge objects, then any connected components in the binary image that are likely to be symbol edge objects are of interest (while connected components that are not likely to be symbol edge objects may not be of interest).

Figure 2:
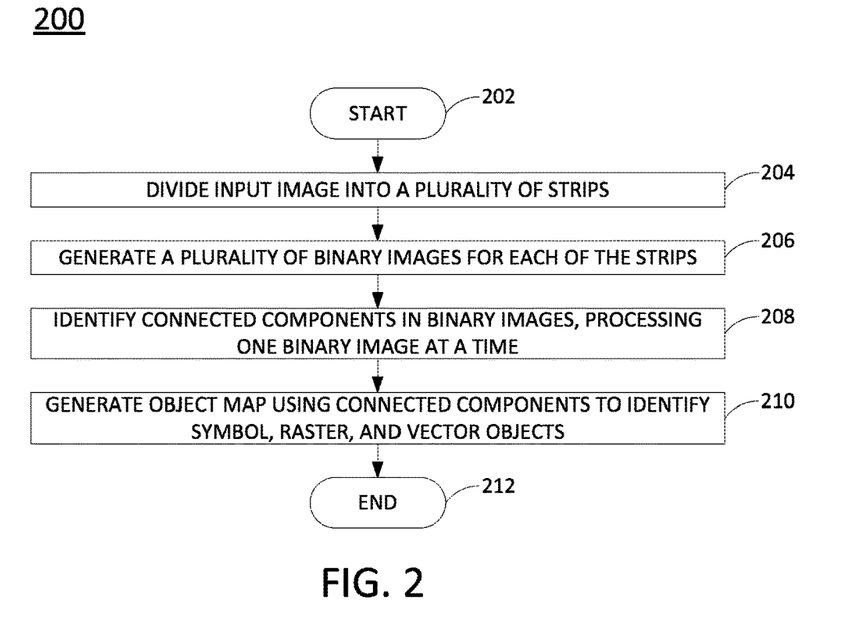
FIG. 2 illustrates a flowchart of an example method for constructing an object map.

FIG. 2 illustrates a flowchart of an example method 200 for constructing an object map. The method 200 may be performed, for example, by various items of the system 100 illustrated in FIG. 1. However, the method 200 is not limited to implementation with the system illustrated in FIG. 1.

The method 200 begins in block 202. In block 204, the row buffer 102 divides an input image (e.g., a digital image) into a plurality of strips. In one example, each strip may be as wide as the input image. Thus, each strip may comprise multiple rows of pixels that stretch across the input image, where each row corresponds to a row or column of a mask window of an edge detection filter used by the edge detector 104. For instance, if the edge detection filter uses 3×3 mask windows, then the row buffer 202 may store three rows of pixels.

In block 206, the edge detector 104 and/or connected component labeler 106 generate a plurality of binary images for each of the strips produced in block 204. In one example, the plurality of binary images are generated by performing edge detection and thresholding on the plurality of strips. In one example, three binary images are produced from each strip based on the edge magnitudes of the pixels: (1) a first binary image to facilitate identification of symbol edge objects; (2) a second binary image to facilitate identification of symbol interior objects; and (3) a third binary image to facilitate identification of vector objects. One example of a method for generating the plurality of binary images is discussed in further detail in connection with FIG. 3.

In block 208, the connected component labeler 106 and/or classifier 112 identifies connected components in the binary images, processing one binary image at a time. In one example, identifying the connected components uses a multiple-pass CCL technique that detects and labels sets of connected pixels in the binary image. One example of a method for labeling objects is discussed in greater detail in connection with FIG. 4.

In block 210, the object map builder 116 generates an object map, using the connected components to identify symbol, raster, and vector objects in the input image. In one example, the multiple-pass CCL technique is used to identify which of the connected components is of interest in a given binary image. The objects of interest will vary based on the type of binary image being analyzed. For instance, in a binary image created to detect symbol edge objects, the connected components that are of interest will be those connected components that are likely to be symbol edge objects. Once the objects of interest are identified in each of the binary images corresponding to each strip, all of the symbol, raster, and vector objects can be identified and labeled in an object map.

The method 200 ends in block 212.

Figure 3:
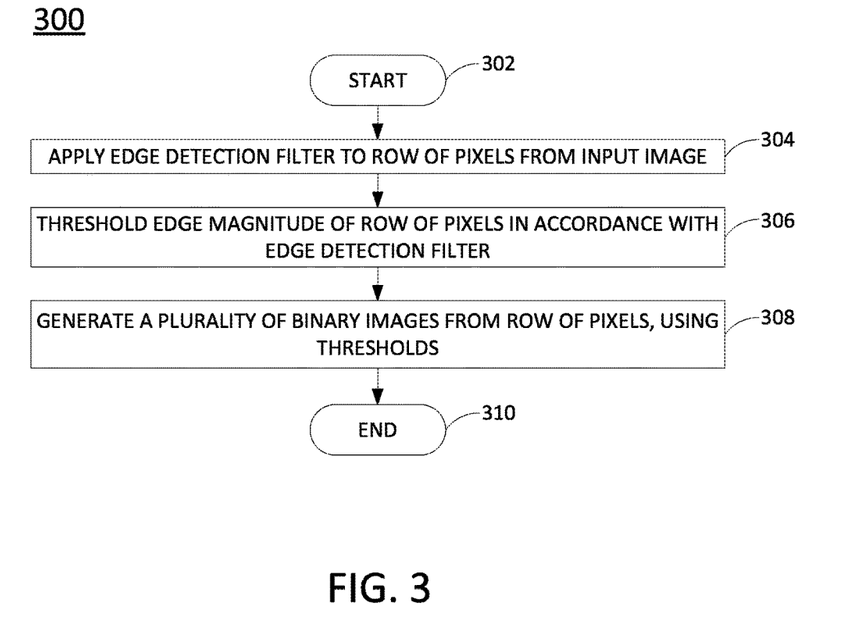
FIG. 3 illustrates a flowchart of an example method for generating a plurality of binary images.

FIG. 3 illustrates a flowchart of an example method 300 for generating a plurality of binary images. The method 300 may be performed, for example, by the edge detector 104 and/or connected component labeler 106 illustrated in FIG. 1. However, the method 300 is not limited to implementation with the system illustrated in FIG. 1.

The method 300 begins in block 302. In block 304, the edge detector 104 applies an edge detection filter to a row of pixels from the input image in order to identify locations in the row at which there are discontinuities in the image brightness. In one example, the edge detection filter is a Sobel filter. In this case, the edge detection filter includes two 3×3 mask windows: a first mask window to detect horizontal gradients and a second mask window to detect vertical gradients. The first mask window, $G_x$, may be defined as:

$$G_x = \begin{bmatrix} -1 & 0 & +1 \\ -2 & 0 & +2 \\ -1 & 0 & +1 \end{bmatrix}$$

while the second mask window, $G_y$, may be defined as:

$$G_y = \begin{bmatrix} +1 & +2 & +1 \\ 0 & 0 & 0 \\ -1 & -2 & -1 \end{bmatrix}$$

In block 306, the edge detector 104 or the connected component labeler 106 thresholds the edge magnitude of the row of pixels, in accordance with the edge detection filter. In one example, the edge magnitude, EM, of the row of pixels can be computed as:

$$EM = \frac{1}{3} \sum_{i=r,g,b} (G_x * \text{image}[i])^2 + (G_y * \text{image}[i])^2 \quad \text{(EQN. 1)}$$

In one example, thresholding the edge magnitude includes applying two separate thresholds to the edge magnitude. In a further example, these two thresholds include a strong edge threshold (Ts_edge) and a weak edge threshold (Tw_edge).

In block 308, the edge detector 104 or the connected component labeler 106 generates a plurality of binary images from the row of pixels, using the threshold(s) defined in block 306. In one example, where the strong edge threshold and the weak edge threshold are used, three binary images may be generated: (1) a strong edge map binary image (where EM≥Ts_edge); (2) a non-strong edge map binary image (where EM<Ts_edge); and (3) a non-edge map binary image (where EM<Tw_edge). The pixels of interest in each of these binary images are the pixels whose edge magnitude satisfies the threshold condition.

The method 300 ends in block 310.

Figure 4:
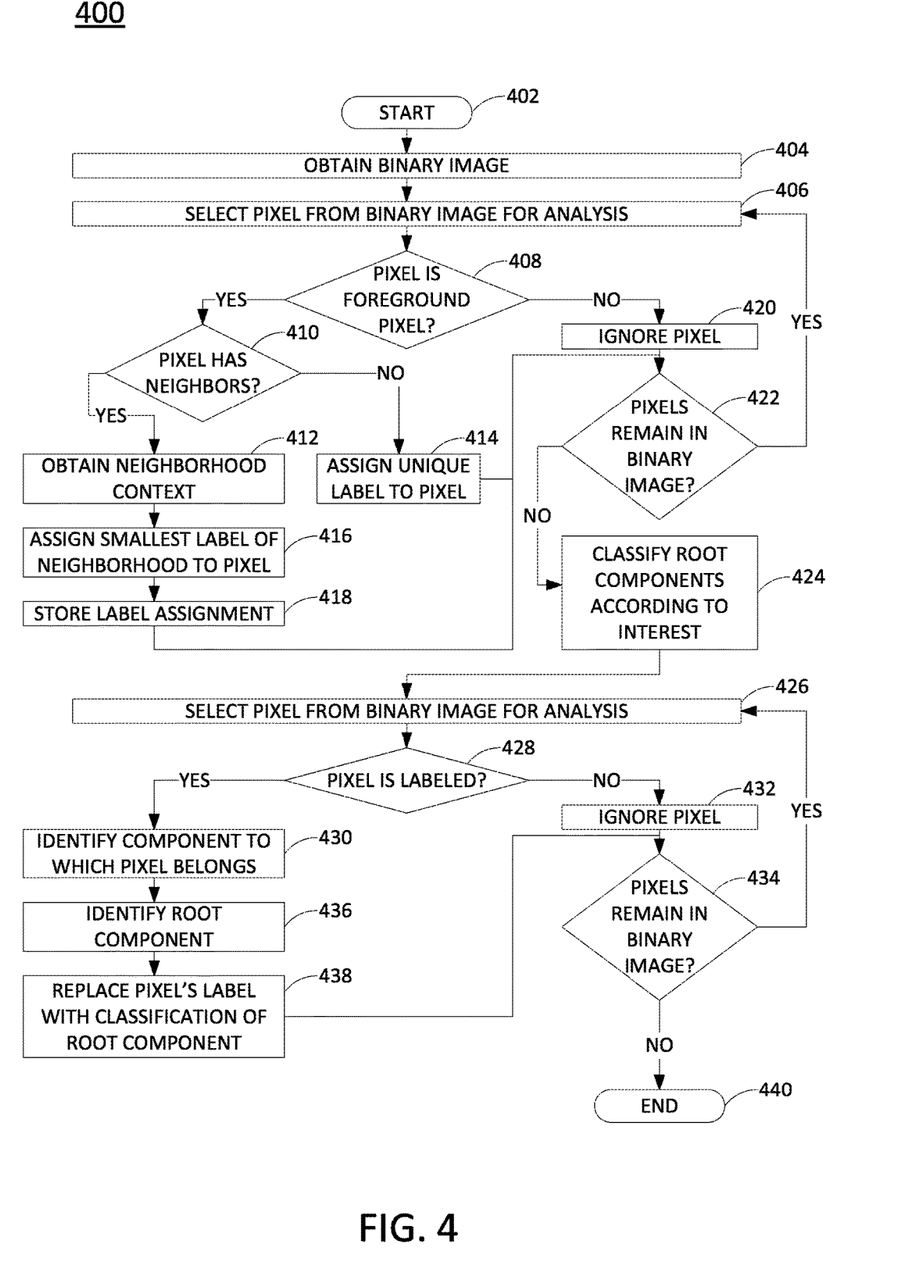
FIG. 4 illustrates a flowchart of an example method for labeling connected components in a binary image.

FIG. 4 illustrates a flowchart of an example method 400 for labeling connected components in a binary image. The method 400 may be performed, for example, by the connected component labeler 106 and/or the classifier 112 illustrated in FIG. 1. However, the method 400 is not limited to implementation with the system illustrated in FIG. 1. Moreover, FIG. 4 and the following discussions may be referenced in conjunction with FIGS. 5A-5F, which illustrate an example set 500 of binary images 502-508 at vary stages of the labeling process illustrated in FIG. 4. Each of the binary images 502-508 in the set 500 corresponds to one strip of an example input image.

The method 400 may be considered as including two "passes" in which the connected component labeler 106 and/or the classifier 112 analyzes the pixels in a given binary image. The first pass generally comprises blocks 404-424 of the method 400, while the second pass generally comprises blocks 426-438. FIG. 4 illustrates the whole two-pass labeling process for a single binary image, but the same process is performed for each binary image corresponding to the input image. Moreover, the second pass may not follow the first pass immediately for a given binary image. In some examples, the first pass may be performed for a given binary image, and then the first pass for the next binary image may be performed before the second pass for the first binary image is performed.

Figure 5A:
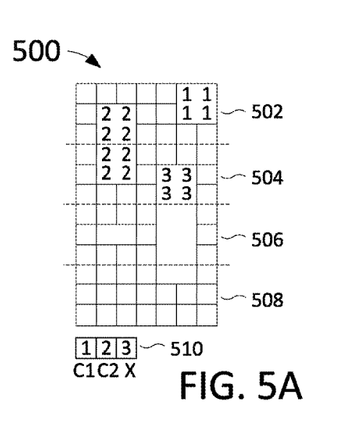
FIGS. 5A-5F illustrate an example set of binary images at vary stages of the labeling process illustrated in FIG. 4.

The method 400 begins in block 402. In block 404, the connected component labeler 106 obtains a binary image. FIG. 5A, for instance, illustrates four separate binary images 502, 504, 506, and 508 that make up the set 500 of binary images. The first binary image 502 includes at least portions of two distinct connected components (i.e., connected sets of foreground pixels, indicated by areas of white pixels).

In block 406, the connected component labeler 106 selects a pixel in the binary image for analysis. In one example, pixels are selected for analysis in raster order. Thus, for instance, if the binary image 502 in FIG. 5A were being analyzed and the method 400 were just beginning, the pixel in the upper left corner of the first (top-most) row of pixels in the binary image 502 would be selected for analysis first. The pixels would then be analyzed moving from left to right, completing each row before moving to the next row down and continuing the left-to-right analysis.

In block 408, the connected component labeler 106 determines whether the selected pixel is a foreground pixel (i.e., a white pixel in a binary image). If the connected component labeler 106 concludes in block 408 that the selected pixel is not a foreground pixel, then the method 400 proceeds to block 420, where the connected component labeler 106 ignores the selected pixel.

In block 422, the connected component labeler 106 determines whether any un-analyzed pixels remain in the binary image (e.g., whether the end of the raster order has been reached by the first pass). If the connected component labeler 106 concludes in block 422 that there are remaining un-analyzed pixels, then the method 400 returns to block 406, and the connected component labeler 106 selects the next pixel for analysis. However, if the connected component labeler concludes in block 422 that there are no remaining un-analyzed pixels, then the method 400 proceeds to block 424 to begin the second pass of the CCL technique, described in further detail below. As discussed above, however, the second pass for the binary image may not occur immediately after the first pass for the binary image.

Referring back to block 408, if the connected component labeler 106 concludes that the selected pixel is a foreground pixel, then the method 400 proceeds to block 410. In block 410, the connected component labeler 106 determines whether the selected pixel has any neighbor pixels. As discussed above, in one example, a 4-connectivity approach to identifying neighbor pixels is used. In this case, any pixels directly to the north or directly to the west of the selected pixel are considered to be neighbor pixels. In other examples, however, different connectivity neighborhood contexts may be used (e.g., 8-connectivity).

If the connected component labeler 106 concludes in block 410 that the selected pixel has no neighbor pixels, then the method 400 proceeds to block 412, where the connected component labeler assigns a unique (i.e., not yet used) label to the selected pixel. In one example, the labels are numeric labels, and the labels are used in numerical order (e.g., starting with "1" for the first pixel to be labeled). For instance, in FIG. 5A, the first pixel encountered in the raster order (i.e., in the first row of the binary image 502) is labeled with the label "1." The first subsequently encountered white pixel that is not a neighbor of this pixel (i.e., in the second row of the binary image 502) is labeled with the label "2."

In one example, block 412 also includes extracting features of the selected pixel and storing them (e.g., in the example component array 510, which may correspond to the component array 110 of FIG. 1). The method 400 then proceeds to block 422, and the connected component labeler 106 determines whether there are any remaining un-analyzed pixels in the binary image, as discussed above.

However, if the connected component labeler concludes in block 410 that the selected pixel does have at least one neighbor pixel, then the method 400 continues to block 414, where the connected component labeler 106 obtains the neighborhood context (i.e., the identities of the neighbor pixels) of the selected pixel.

In block 416, the connected component labeler 106 assigns the smallest label of the neighborhood to the selected pixel. Thus, if the labels assigned to the pixels are numerical labels, then the labels of the selected pixel's neighbor pixels are examined, and the label comprising the smallest number is assigned to the selected pixel. For instance, if the selected pixel's north neighbor has been assigned a label of "1," and the selected pixel's west neighbor has been assigned a label of "2," the selected pixel will be assigned the label of "1." In FIG. 5A, the first pixel encountered in the raster order was labeled with the label "1." Subsequently encountered white pixels that are neighbors of this pixel (i.e., in the first and second rows of the binary image 502) were also labeled with the label "1."

In one example, block 416 also includes extracting features of the selected pixel and storing them (e.g., in the example component array 510). Moreover, if the selected pixel's neighbors had different labels, an equivalence between the different labels may also be recorded (e.g., in the example component array 510). This equivalence indicates that the neighbors of differing labels may be part of the same connected component, the entirety of which has not yet been discovered.

In block 418, the connected component labeler 106 stores the label assignment made in block 416 (e.g., in the label buffer 108 of the system 100). The method 400 then proceeds to block 422, and the connected component labeler 106 determines whether there are any remaining un-analyzed pixels in the binary image, as discussed above.

When no pixels are determined to remain in block 422, the first pass of the method 400 is considered to be complete. FIG. 5A illustrates the example binary images 502 and 504 after completion of a first pass of the method 400. As illustrated, each pixel in each of the (whole or partial) connected components is assigned a label (e.g., a numeric label) according to the process described in blocks 404-422. This has resulted in a total of three unique labels (numbered 1-3) being used to label the pixels of the connected components.

Once all pixels of the binary image have been determined to have been analyzed in the first pass, the method 400 proceeds to block 424. In block 424, the connected component labeler 106 and/or the classifier 112 classifies the root components of any connected components that were identified in the first pass. In one example, a connected component may comprise multiple different sets of connected pixels, where the pixels of each of the sets are labeled with different labels. In this case, the root component of the connected component comprises the set of connected pixels that is labeled with the smallest label. One example of a method for classifying pixels in connection with block 424 is discussed in further detail in connection with FIG. 7.

In one example, root components are classified as being "of interest" or "not of interest," based on the type of the binary image. In one example, whether a connected component is of interest or not depends on the type of the binary image (e.g., strong edge map, non-strong edge map, or non-edge map), which will dictate the types of objects that are of interest. For instance, if the binary image is a strong edge map binary image, then the objects of interest are symbol edge objects. If the binary image is a non-strong edge map binary image, then the objects of interest are symbol interior objects. If the binary image is a non-edge map binary image, then the objects of interest are vector objects. Shorthand labels may be used to designate these classifications, such as "C1" for components that are of interest and "C2" for components that are not of interest. For instance, the example component array 510 shown in FIG. 5A illustrates that the pixels labeled "1" are of interest, while the pixels labeled "2" are not of interest.

Once the connected components have been classified as being of interest or not of interest, the method 400 may proceed to the second pass, which begins in block 426. As discussed above, however, the second pass may not proceed immediately. In block 426, the connected component labeler 106 selects a pixel from the binary image for analysis in the second pass. In one example, pixels are selected for analysis in raster order, as in the first pass. In this case, the first time that the connected component labeler 106 performs the operations in block 426, it will select the pixel at the start of the raster order (e.g., the left-most pixel of the first row in the example binary image 502 in FIG. 5B).

In block 428, the connected component labeler 106 determines whether the selected pixel is a labeled with a classification (e.g., C1 or C2) from block 424. In one example, the selected pixel will be labeled with a classification if the selected pixel belongs to a root component of a connected component. If the connected component labeler 106 concludes in block 428 that the selected pixel is not labeled with a classification, then the method 400 proceeds to block 432, where the connected component labeler 106 ignores the selected pixel.

In block 434, the connected component labeler 106 determines whether any un-analyzed pixels remain in the binary image (e.g., whether the end of the raster order has been reached by the second pass). If the connected component labeler 106 concludes in block 434 that there are remaining un-analyzed pixels, then the method 400 returns to block 426, and the connected component labeler 106 selects the next pixel for analysis. However, if the connected component labeler concludes in block 434 that there are no remaining un-analyzed pixels, then the method 400 ends in block 440.

Referring back to block 426, if the connected component labeler 106 concludes that the selected pixel is a labeled with a classification, then the method 400 proceeds to block 430. In block 430, the connected component labeler 106 and/or the classifier 112 identifies the connected component to which the selected pixel belongs (e.g., by consulting the example component array 510 for equivalencies).

In block 436, the connected component labeler 106 and/or the classifier 112 identifies the root component of the connected component (e.g., by consulting the example component array 510 for equivalencies).

Figure 5B:
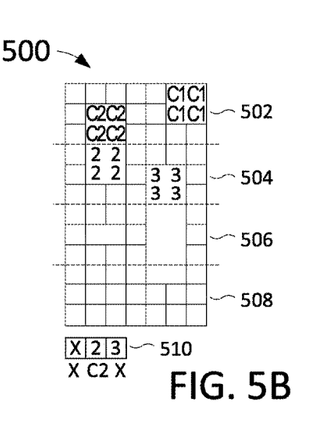

In block 438, the connected component labeler 106 and/or the classifier 112 replaces the selected pixel's current label with the classification label of the root component. This indicates whether the selected pixel is of interest or not of interest. FIG. 5B, for instance, illustrates the example binary image 502 after the second pass of the method 400. As illustrated, in each of the two connected components, the previous labels of the pixels (i.e., "1" or "2") have been replaced with classification labels (i.e., "C1" or "C2") indicating whether the pixels are of interest or not.

The method 400 then proceeds to block 434, and the connected component labeler 106 determines whether there are any remaining un-analyzed pixels in the binary image, as discussed above. If no un-analyzed pixels remain, then the second pass is considered to be complete for the binary image, and the method 400 ends in block 440.

A result of the method 400 is a version of the original binary image in which only the pixels of interest remain.

Figure 5C:
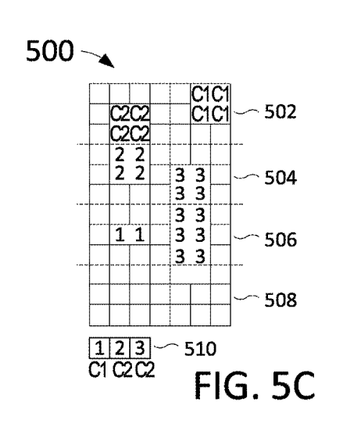

The method 400 is performed for each binary image corresponding to the input image (e.g., where each binary image corresponds to one strip of the input image). As discussed above, in one example, the second pass of the method 400 is not performed for a given binary image until the first pass is performed for the immediately subsequent binary image. For instance, FIG. 5C illustrates the case where a first pass is performed for the binary image 506, but the second pass on the immediately previous binary image (i.e., binary image 504) is not performed until FIG. 5D. FIG. 5E illustrates the results of a first pass being performed on the binary image 508, while FIG. 5F illustrates the results of the second pass being performed on the binary image 506. Thus, the first-pass labeling of the current binary image and the second-pass re-labeling of the previous binary image alternate moving through the binary images in order (e.g., from top to bottom), with an of interest/not of interest classification in between each first pass and second pass being performed until all of the binary images have been re-labeled in a second pass.

This approach allows the labels used in the first pass of the method 400 to be re-used. For instance, the connected component whose pixels are labeled with the label "1" in FIG. 5A ends in the binary image 502 (i.e., the connected component does not cross the boundary between the binary image 502 and the binary image 504). Thus, once the labels for these pixels are replaced with the appropriate second-pass classification label(s) (i.e., "C1" in FIG. 5B), the label "1" becomes free for use to label the next white pixel that has no neighbors (e.g., as illustrated in FIG. 5C, in binary image 506). As shown in FIG. 5B, the availability of the "1" label is indicated in the example component array 510 (as shown by the "x" in the place previously occupied by the "1").

Figure 5D:
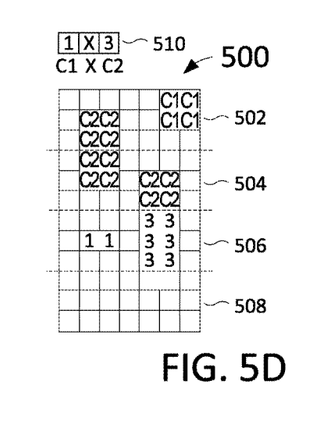
Figure 5E:
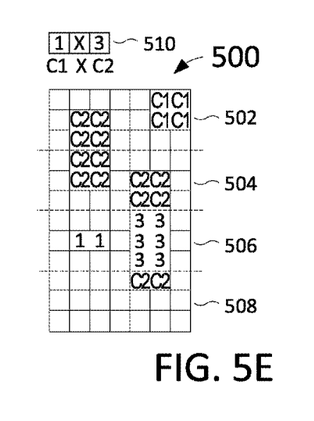
Figure 5F:
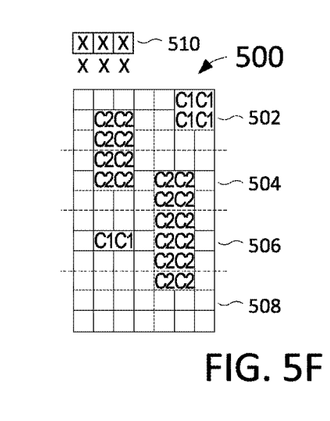

In some cases, connected components may be identified as "bounded" or "unbounded." A bounded connected component crosses fewer than two binary image boundaries (e.g., the connected components whose pixels are labeled "1" and "2" in FIG. 5A), while an unbounded component crosses two or more binary image boundaries (e.g., the connected component whose pixels are labeled "3" in FIGS. 5B-5E). Where a connected component is unbounded, it may be classified as of interest or not of interest after the first pass is completed for the second binary image occupied by the connected component. This is shown in FIGS. 5C and 5D. In one example, classification of the connected component in this case is based on the features of the pixels that are above the second crossed binary image boundary. However, pixels residing beyond the second crossed binary image boundary may not be taken into account at this stage (e.g., the unlabeled white pixels in the binary image 508 in FIG. 5D). Moreover, when the first pass is performed for the third crossed binary image, pixels belonging to the unbounded connected component may be assigned the second-pass label of the connected component, which has already been classified as of interest or not of interest. For instance, FIG. 5E shows that the white pixels in the binary image 508, which belong to an unbounded connected component, are labeled with the second-pass "C2" label rather than the first-pass "3" label. This allows second-pass labels to carry across binary image boundaries and also prevents the first-pass label from propagating all the way through the set 500 of binary images (and thereby being unavailable for reuse).

In some cases, even if first-pass labels were freed for reuse at every binary image boundary, there would still be many components that are not of interest (e.g., single-pixel components), but for which space in memory must be maintained at least until the binary image boundary is reached. In one example, the method 400 includes an extra function that checks the root components of each row of pixels in order to determine which root components have already ended in the current binary image. In one example, this can be accomplished by comparing the maximum vertical coordinate of the root component to a row counter pointing to the row of pixels for which labels are currently being assigned. If the root component ends in the current row, it can be immediately classified as of interest or not of interest. Moreover, if the root component is determined to be not of interest, then the root component and its leaf components can be freed and reused.

Figure 6A:
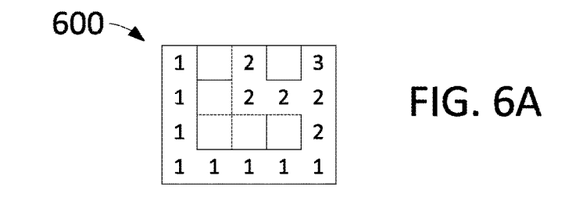
FIGS. 6A-6F illustrate the operation of an example component array.

As discussed above, an equivalence between the different first-pass labels may be recorded (e.g., in a component array) in order to indicate when neighboring pixels of differing labels may be part of the same connected component. FIGS. 6A-6F illustrate the operation of an example component array 602. The example component array 602 may operate in a manner similar to the component array 110 of FIG. 1 and/or the component array 510 of FIGS. 5A-5F. In particular, FIG. 6A illustrates an example binary image 600. FIGS. 6B-6F illustrate the example component array 602 that may be used to store data about the pixels in the example binary image 600 during execution of the method 400.

Figure 6B:
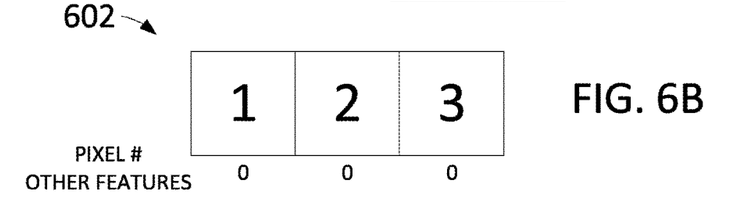

In one example, the component array 602 is a one-dimensional array, e.g., similar to a union-find data structure. FIG. 6B illustrates the component array 602 at initialization. As illustrated, the component array 602 is initialized with its own index, and each array element is mapped to a set of extracted pixel features (e.g., by a pointer).

During the first pass of the method 400, whenever a new label is needed in the first pass (e.g., when it is determined in block 410 that a selected pixel has no neighbor pixels), the connected component labeler 106 will scan through the component array 602 from the smallest index unit, until an available array element is identified. The index of the available array element will be used as a new label for the selected pixel, and a corresponding set of extracted features will be created. The array element is also now designated as unavailable. Moreover, for each foreground pixel identified in the first pass of the method 400, a corresponding set of extracted features is updated in the component array 602.

In the event that a pixel having two neighbors with two different labels is encountered, an equivalence between the two different labels may be recorded in the component array 602 (e.g., as discussed in connection with block 416 of the method 400). In one example, the equivalence is recorded by first identifying the smaller of the two corresponding labels, and then augmenting the content indexed by the smaller label to include the content indexed by the larger label. Additionally, the sets of extracted features corresponding to both labels are merged to form a single feature set. In one example, after recording the equivalence, future pixels are labeled by assigning the label not from the pixel's neighbors, but from the root (i.e., smallest) label that is equivalent to the neighbors' labels.

Figure 6C:
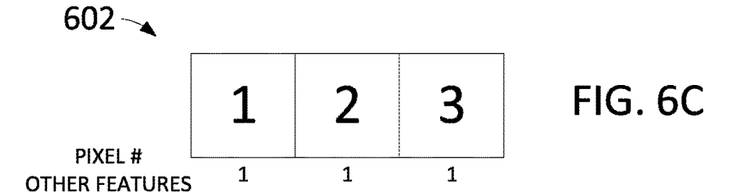

FIGS. 6C-6F illustrate the evolution of the component array as the method 400 moves through the first pass. As illustrated in FIG. 6C, after the first (i.e., topmost) row of the binary image 600 is analyzed in the first pass, the labels "1," "2," and "3" are each assigned to one pixel.

Figure 6D:
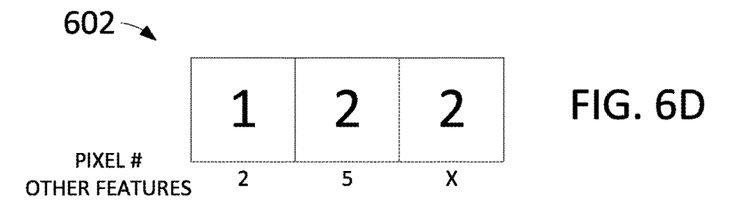

After the second row of the binary image is analyzed, the last pixel of the second row is determined to have a north neighbor assigned a label of "3" and a west neighbor assigned a label of "2." Thus, the last pixel of the second row is assigned the label of "2." In addition, there is now an identified equivalence between the "2" and "3" labels that motivates the updating of the component array 602 (as illustrated in FIG. 6D). The pixel that was previously assigned a label of "3" is now assigned the label of "2." Thus, the label of "1" is now assigned to two pixels, and the label of "2" is now assigned to five pixels. Moreover, the sets of extracted features associated with the "2" and "3" labels are merged. The memory space (array element) that was previously devoted to the set of extracted features associated with the "3" label is now freed up, since the set of extracted features is now included in the set of extracted features associated with the "2" label.

Figure 6E:
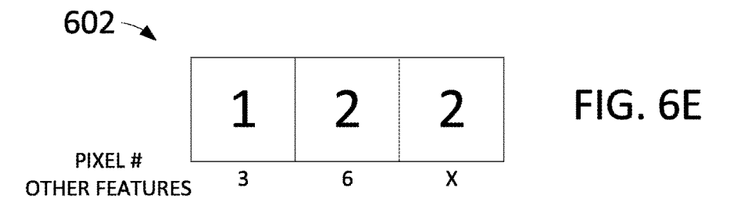

After the third row of the binary image is analyzed, the label of "1" is now assigned to three pixels, and the label of "2" is now assigned to six pixels (FIG. 6E).

Figure 6F:
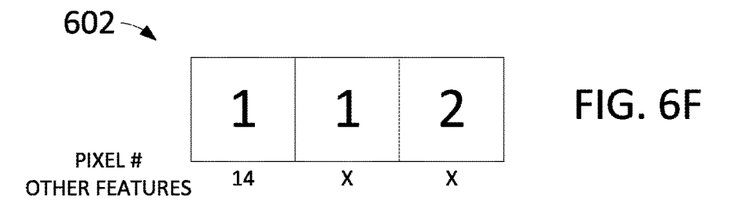

After the fourth row of the binary image is analyzed, the last pixel of the fourth row is determined to have a north neighbor assigned a label of "2" and a west neighbor assigned a label of "1." Thus, the last pixel of the fourth row is assigned the label of "1." In addition, there is now an identified equivalence between the "1" and "2" labels that motivates the updating of the component array 602 (as illustrated in FIG. 6F). All of the pixels that were previously assigned a label of "2" are now assigned the label of "1," and the sets of extracted features associated with the "1" and "2" labels are merged. Thus, the label of "1" is now assigned to fourteen pixels.

As discussed above, once first-pass labeling is complete, but before beginning the second pass, the connected component labeler 106 and/or the classifier 112 may classify all of the root components (i.e., sets of connected pixels that are labeled with a smallest label, such as those labeled "1" in the FIG. 6A, and that may be connected other sets of connected pixels labeled with larger labels) in the component array 602 as being either "of interest" or "not of interest." These classifications may be recorded in the sets of extracted features for the root components. All other connected components that are rooted at (i.e., connected to) the root component will carry the same classification (e.g., the connected components whose connected pixels are labeled "2" or "3" in FIG. 6A). In one example, classification of all root components is performed in a one-pass scan of the component array 602, which has approximately linear time complexity.

Figure 7:
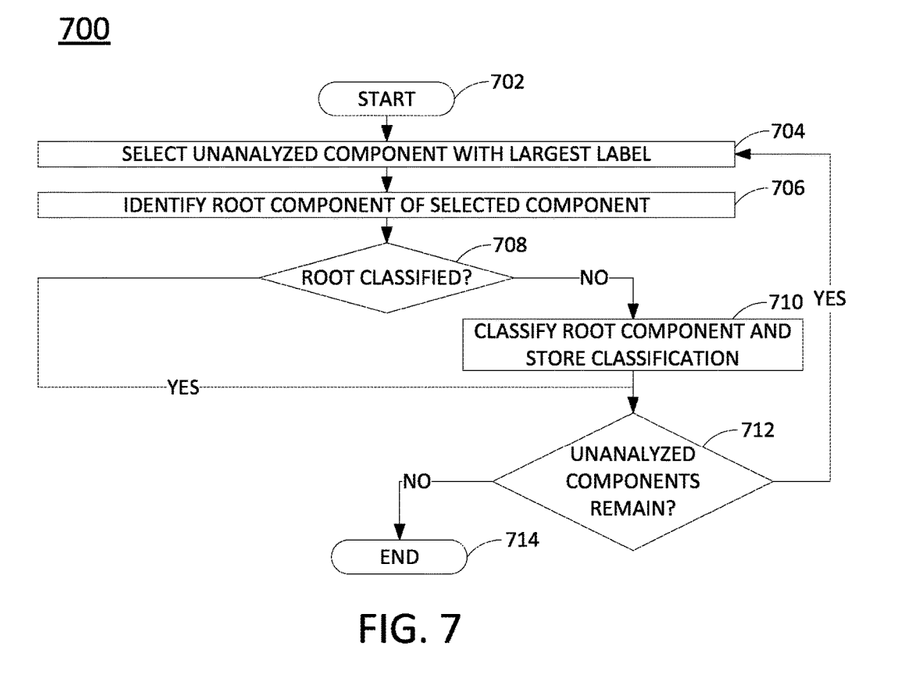
FIG. 7 illustrates a flowchart of an example method for classifying root components identified in a first pass of the method illustrated in FIG. 4.

FIG. 7 illustrates a flowchart of an example method 700 for classifying root components identified in a first pass of the method 400 illustrated in FIG. 4. The method 700 may be performed, for example, by the connected component labeler 106 and/or classifier 112 illustrated in FIG. 1 (e.g., in connection with block 424 of the method 400). However, the method 700 is not limited to implementation with the system illustrated in FIG. 1.

The method 700 begins in block 702. In block 704, the connected component labeler 106 and/or classifier 112 selects the unanalyzed connected component with the largest label. In one example, the connected components are analyzed in reverse order, starting with the connected component whose connected pixels are labeled with the largest label and continuing in order until the connected component whose pixels are labeled with the smallest label is analyzed.

In block 706, the connected component labeler 106 and/or classifier 112 identifies the root component of the selected connected component. The root component is the connected component whose connected pixels are labeled with the smallest equivalent label to the connected pixels of the selected connected component.

In block 708, the connected component labeler 106 and/or classifier 112 determines whether the root component has already been classified. If the connected component labeler 106 concludes in block 708 that the root component has already been classified, then the method 700 proceeds to block 712.

In block 712, the connected component labeler 106 and/or classifier 112 determines whether there are any unanalyzed connected components remaining in the binary image. If the connected component labeler 106 concludes that there are no remaining unanalyzed connected components, then the method 700 ends in block 714. However, if the connected component labeler 106 concludes that there are remaining unanalyzed connected components, then the method 700 returns to block 704, and the connected component labeler 106 selects the next unanalyzed connected component for analysis, proceeding as described above.

Referring back to block 708, if the connected component labeler 106 and/or classifier 112 concludes that the root component has not yet been classified, then the method 700 proceeds to block 710. In block 710, the connected component labeler 106 classifies the root component as being either "of interest" or "not of interest." Shorthand labels may be used to designate these classifications, such as "C1" for components that are of interest and "C2" for components that are not of interest. As discussed above, whether a component is of interest or not may depend on the type of the binary image (e.g., strong edge map, non-strong edge map, or non-edge map), which will dictate the types of objects that are of interest. For instance, if the binary image is a strong edge map binary image, then the objects of interest are symbol edge objects. If the binary image is a non-strong edge map binary image, then the objects of interest are symbol interior objects. If the binary image is a non-edge map binary image, then the objects of interest are vector objects.

Once the root component has been classified, the method 700 returns to block 704, and the connected component labeler 106 selects the next unanalyzed connected component for analysis, proceeding as described above.

It should be noted that although not explicitly specified, some of the blocks, functions, or operations of the methods 200, 300, 400 and 700 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 2-4 and 7 that recite a determining operation, or involve a decision, do not imply that both branches of the determining operation are practiced. In other words, one of the branches of the determining operation may not be performed, depending on the results of the determining operation.

Figure 8:
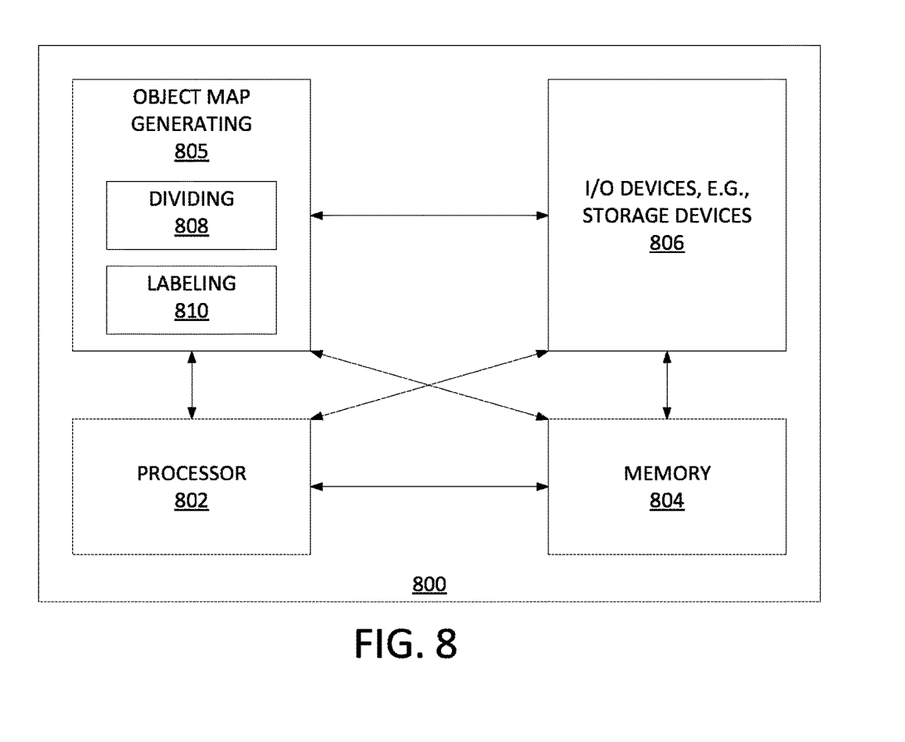
FIG. 8 depicts a high-level block diagram of an example computer that can be transformed into a machine capable of performing the functions described herein.

FIG. 8 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to provide an object map generated from multiple binary images, as disclosed herein.

As depicted in FIG. 8, the computer 800 comprises a hardware processor element 802, e.g., a central processing unit (CPU), a microprocessor, or a multi-core processor, a memory 804, e.g., a temporary memory such as random access memory (RAM) and/or read only memory (ROM), an object map generating module 805 for generating an object map from a plurality of binary images, and various input/output devices 806, e.g., storage devices, including but not limited to, a persistent memory array, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like.

Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 805 for generating an object map from a plurality of binary images, e.g., machine readable instructions can be loaded into memory 804 and executed by hardware processor element 802 to implement the blocks, functions or operations as discussed above in connection with the methods 200, 300, 400, and 700. For instance, the module 805 may include a plurality of programming code components, including a dividing component 808, and a labeling/classifying component 810.

The dividing component 808 may be configured to divide an input image into strips prior to the generation of binary images, for example as discussed in connection with FIG. 2. The labeling/classifying component 810 may be configured label and classify the pixels and connected components of the binary images, for example as discussed in connection with FIGS. 2, 4, and 7, and in conjunction with various data structures including a component array as discussed in connection with FIGS. 1, 5A-5F, and 6A-6F.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 805 for generating an object map based on a plurality of binary images, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
dividing, by a processor element, an input image into a plurality of strips, where each strip of the plurality of strips is smaller than a whole of the input image;
generating, by the processor element, a plurality of binary images, where each binary image of the plurality of binary images corresponds to a strip of the plurality of strips, wherein the plurality of binary images comprises at least three binary images corresponding to each strip of the plurality of strips and wherein the at least three binary images each comprise a respective binary image in which edge magnitudes for all white pixels in the respective binary image are at least equal to at least one of: a strong edge threshold and a weak edge threshold;
executing, by the processor element, for a first binary image of the plurality of binary images,
a first pass in which foreground pixels of the first binary image are assigned labels that identify connected components in the first binary image; and
a second pass, subsequent to the first pass, in which:
any of the labels that correspond to connected components that exist entirely in the first binary image are freed in memory; and any of the labels that correspond to connected components that are merged with other connected components are re-labeled to reduce a number of labels stored in a memory data structure; and generating, by the processor element, an object map for the input image based on results of the connected component labeling for the plurality of binary images.

2. The method of claim 1, wherein executing the second pass further comprises classifying as being of interest or not of interest according to a type of the first binary image.

3. The method of claim 2, further comprising:
classifying root components of the connected components as being of interest or not of interest, after executing the first pass but prior to executing the second pass.

4. The method of claim 1, wherein the first pass is performed for a second binary image of the plurality of binary images after the first pass is executed for the first binary image, but prior to executing the second pass for the first binary image.

5. The method of claim 4, wherein executing the first pass for the second binary image comprises:
reusing at least one of the labels that has been freed in memory by assigning the at least one of the labels to a foreground pixel in the second binary image having no previously identified neighbor pixels.

6. The method of claim 4, wherein at least one connected component of the connected components is an unbounded connected component that crosses a boundary between the first binary image and the second binary image and also crosses a boundary between the second binary image and a third binary image.

7. The method of claim 6, further comprising:
classifying the unbounded connected component as of interest or not of interest after the first pass is executed for the second binary image but before the second pass is executed for the second binary image.

8. A non-transitory machine-readable storage medium encoded with instructions that when executed by a processor cause the processor to:
divide an input image into a plurality of strips, where each strip of the plurality of strips is smaller than a whole of the input image;
generate a plurality of binary images, where each binary image of the plurality of binary images corresponds to a strip of the plurality of strips, wherein the plurality of binary images comprises at least three binary images corresponding to each strip of the plurality of strips and wherein the at least three binary images each comprise a respective binary image in which edge magnitudes for all white pixels in the respective binary image are at least equal at least one of: a strong edge threshold and a weak edge threshold;
execute, for a first binary image of the plurality of binary images,
a first pass in which foreground pixels of the first binary image are assigned labels that identify connected components in the first binary image; and
a second pass, subsequent to the first pass, in which:
any of the labels that correspond to connected components that exist entirely in the first binary image are freed in memory; and
any of the labels that correspond to connected components that are merged with other connected components are re-labeled to reduce a number of labels stored in a memory data structure; and
generate an object map for the input image based on results of the connected component labeling for the plurality of binary images.

9. The non-transitory machine-readable storage medium of claim 8, wherein to execute the second pass, the instructions are further to cause the processor to:
classify the connected components as being of interest or not of interest according to a type of the first binary image.

10. The non-transitory machine-readable storage medium of claim 8, wherein the first pass is performed for a second binary image of the plurality of binary images after the first pass is executed for the first binary image, but prior to executing the second pass for the first binary image.

11. The non-transitory machine-readable storage medium of claim 10, wherein to execute the first pass for the second binary image, the instructions are further to cause the processor to:
reuse at least one of the labels that has been freed in memory by assigning the at least one of the labels to a foreground pixel in the second binary image having no previously identified neighbor pixels.

12. The non-transitory machine-readable storage medium of claim 10, wherein at least one connected component of the connected components is an unbounded connected component that crosses a boundary between the first binary image and the second binary image and also crosses a boundary between the second binary image and a third binary image.

13. An apparatus, comprising:
a buffer for dividing an input image into a plurality of strips, where each strip of the plurality of strips is smaller than a whole of the input image;
a processor; and
a memory on which is stored machine readable instructions that when executed by the processor, cause the processor to:
generate a plurality of binary images, where each binary image of the plurality of binary images corresponds to a strip of the plurality of strips, wherein the plurality of binary images comprises at least three binary images corresponding to each strip of the plurality of strips and wherein the at least three binary images each comprise a respective binary image in which edge magnitudes for all white pixels in the respective binary image are at least equal to at least one of: a strong edge threshold and a weak edge threshold;
execute, for a first binary image of the plurality of binary images,
a first pass in which foreground pixels of the first binary image are assigned labels that identify connected components in the first binary image; and
a second pass, subsequent to the first pass, in which:
any of the labels that correspond to connected components that exist entirely in the first binary image are freed in memory; and
any of the labels that correspond to connected components that are merged with other connected components are re-labeled to reduce a number of labels stored in a memory data structure; and
generate an object map for the input image based on results of the connected component labeling for the plurality of binary images.

14. The apparatus of claim 13, wherein the instructions are further to cause the processor to:
  implement the object map in an electrophotography operation to print the input image.

* * * * *

UNITED STATES PATENT AND TRADEMARK OFFICE
CERTIFICATE OF CORRECTION

PATENT NO. : 10,460,219 B2
APPLICATION NO. : 15/087246
DATED : October 29, 2019
INVENTOR(S) : Brent Michael Bradburn et al.

Page 1 of 1

It is certified that error appears in the above-identified patent and that said Letters Patent is hereby corrected as shown below:

In the Claims

Column 15, Line 9, Claim 2, delete "classifying" and insert -- classifying the connected components --, therefor.

Signed and Sealed this
Twenty-fourth Day of March, 2020

Andrei Iancu
*Director of the United States Patent and Trademark Office*